United States Patent
Jung et al.

(10) Patent No.: US 7,830,913 B2
(45) Date of Patent: Nov. 9, 2010

(54) METHOD OF PROCESSING DATA IN A MEDIUM ACCESS CONTROL (MAC) LAYER

(75) Inventors: Myung Cheul Jung, Seoul (KR); Sung Duck Chun, Gyeonggi-do (KR); Young Dae Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/483,154

(22) Filed: Jun. 11, 2009

(65) Prior Publication Data

US 2009/0245282 A1 Oct. 1, 2009

Related U.S. Application Data

(63) Continuation of application No. 11/239,778, filed on Sep. 29, 2005, now Pat. No. 7,649,907.

(60) Provisional application No. 60/615,106, filed on Sep. 30, 2004.

(30) Foreign Application Priority Data

Jun. 15, 2005 (KR) ...................... 10-2005-0051300

(51) Int. Cl.
*H04J 3/16* (2006.01)
*H04J 3/22* (2006.01)
*H04J 3/24* (2006.01)

(52) U.S. Cl. ...................... 370/466; 370/469; 370/471; 370/474

(58) Field of Classification Search .................. 370/466, 370/469, 471, 474
See application file for complete search history.

(56) References Cited

U.S. PATENT DOCUMENTS 7,369,857 B2 * 5/2008 Lee et al. .................... 455/450

| | | | |
|---|---|---|---|
| 7,525,944 B2 * | 4/2009 | Vayanos et al. | ............. 370/342 |
| 7,535,876 B2 | 5/2009 | Cheng et al. | |
| 2002/0009999 A1 | 1/2002 | Lee et al. | |

(Continued)

FOREIGN PATENT DOCUMENTS

EP 0991208 4/2000

(Continued)

OTHER PUBLICATIONS

LG Electronics; "Mac-e PDU Overhead Reduction", 3GPP TSG-RAN WG2 Rel-6 Adhoc; R2-041348; Jun. 21, 2004.

(Continued)

*Primary Examiner*—Chi H Pham
*Assistant Examiner*—Farah Faroul
(74) *Attorney, Agent, or Firm*—Lee, Hong, Degerman, Kang & Waimey

(57) ABSTRACT

A method of processing data in a Medium Access Control (MAC) layer through which at least one first channel is mapped to a second channel in a transmitting end of a wireless communication system is disclosed. More specifically, a MAC layer data block is configured by including at least one higher layer data block received through the at least one first channel and adding a header thereto which includes at least one field which indicates at least two types of information. Furthermore, the MAC layer data block is transferred to a lower layer through the second channel.

24 Claims, 6 Drawing Sheets

U.S. PATENT DOCUMENTS

| | | | |
|---|---|---|---|
| 2003/0007517 A1 | 1/2003 | Beckmann et al. | |
| 2003/0007617 A1 | 1/2003 | McAlinden | |
| 2003/0185193 A1* | 10/2003 | Choi et al. | 370/348 |
| 2003/0210669 A1 | 11/2003 | Vayanos et al. | |
| 2004/0208160 A1 | 10/2004 | Petrovic et al. | |
| 2005/0053035 A1* | 3/2005 | Kwak et al. | 370/331 |
| 2005/0180371 A1 | 8/2005 | Malamaki | |
| 2006/0013268 A1 | 1/2006 | Terry | |
| 2006/0046733 A1* | 3/2006 | Fauconnier et al. | 455/450 |
| 2006/0153232 A1 | 7/2006 | Shvodian | |
| 2008/0137652 A1 | 6/2008 | Herrmann et al. | |
| 2008/0181166 A1 | 7/2008 | Lee et al. | |
| 2008/0273483 A1 | 11/2008 | Zhang et al. | |
| 2009/0077346 A1* | 3/2009 | Steinert et al. | 712/34 |
| 2009/0086708 A1* | 4/2009 | Pani et al. | 370/349 |

FOREIGN PATENT DOCUMENTS

| | | |
|---|---|---|
| RU | 2232477 | 7/2004 |
| RU | 2233543 | 7/2004 |
| WO | 2004042964 | 5/2004 |

OTHER PUBLICATIONS

LG Electronics; "Mulitplexing Options And MAC-e PDU Overhead"; 3GPP TSG-RAN WG2, Meeting #42; R2-041055; May 10, 2004.

Nokia; "FDD Enhanced Uplink, Some L2 Issues", 3GPP TSG-RAN WG2, Meeting #42; R2-040964; May 10, 2005.

Ericsson; "E-DCH Multiplexing and Transport Channel Structure", 3GPP TSG-RAN WG2, Meeting #42; R2-040917; May 10, 2004.

3GPP Organizational Partners; 3rd Generation Partnership Project; Technical Specification Group Radio Access Network; Medium Access Control (MAC) Protocol Specification (Release 6)' 3GPP TS 25.321, V6.2.0; Jun. 2004.

* cited by examiner

METHOD OF PROCESSING DATA IN A MEDIUM ACCESS CONTROL (MAC) LAYER

This application is a continuation of U.S. application Ser. No. 11/239,778 filed Sep. 29, 2005, now U.S. Pat. No. 7,649, 907, issued Jan. 19, 2010, which pursuant to 35 U.S.C. §119 (a) claims the benefit of Korean Application No. 10-2005-51300, filed on Jun. 15, 2005, and which pursuant to 35 U.S.C. §119(e) claims the benefit of U.S. Provisional Application No. 60/615,106, filed on Sep. 30, 2004, in the name of inventors Sung Duck CHUN and Young Dae LEE, titled "MBMB and HSUPA," which are hereby incorporated by reference in their entirety.

BACKGROUND OF THE INVENTION

1. Field of the Invention

The present invention relates to a method of processing data, and more particularly, to processing data in a Medium Access Control (MAC) layer.

2. Discussion of the Related Art

FIG. 1 is a structural diagram illustrating an Universal Mobile Telecommunication System (UMTS) network of a conventional mobile communication system. The UMTS is comprised of, largely, a user equipment (UE), a UMTS Terrestrial Radio Access Network (UTRAN), and a core network (CN). The UTRAN comprises at least one Radio Network Sub-systems (RNS), and each RNS is comprised of one Radio Network Controller (RNC) and at least one base station (Node B) which is controlled by the RNC. In each Node B, there is at least one cell.

FIG. 2 is a diagram illustrating a structure of a Radio Interface Protocol (RIP) which is located between a UE and the UTRAN. Here, the UE is associated with a $3^{rd}$ Generation Partnership Project (3GPP) wireless access network standard. The structure of the RIP is comprised of a physical layer, a data link layer, and a network layer on the horizontal layers. On the vertical plane, the structure of the RIP is comprised of a user plane, which is used for transmitting data, and a control plane, which is used for transmitting control signals. The protocol layers of FIG. 2 can be categorized as L1 (first layer), L2 (second layer), and L3 (third layer) using an Open System Interconnection (OSI) modes as the basis.

L1 uses the physical channel to provide Information Transfer Service (ITS) to the higher layer. The physical layer is connected with the MAC layer via a transport channel through which data between the two layers is transmitted. As for transmitting data between the transmitting side and the receiving side, data is transmitted via the physical channel.

In L2, the MAC is connected with the RNC via a logical channel through which the MAC provides service to the RNC. Here, the MAC can be further defined by a plurality of sub-layers, such as MAC-b, MAC-c/sh, MAC-d, MAC-e, based on the transmission channels.

FIG. 3 is a diagram illustrating protocol of an Enhanced Dedicated Channel (E-DCH). As illustrated in FIG. 3, the MAC-e sub-layer, which supports the E-DCH, is located below the UTRAN and the MAC-D sub-layer of the UE, respectively. The MAC-e sub-layer of the UTRAN is located in Node B and in each UE. On the other hand, the MAC-d sub-layer of the UTRAN is located in the Serving RNC (SRNC) and in each UE.

As discussed above, the MAC layer comprises the MAC-d sub-layer, MAC-es sub-layer, and the MAC-e sub-layer. With respect to a UE, there is more than one data channel which can transmit data simultaneously, and each data channel is endowed with different service qualities. Here, the service quality refers to data error ratio and transmission delay time, for example, and follows independent service quality parameter for each data channel. In other words, for example, if there are a voice service and an internet service, since the parameters for providing each service is different, the settings for the downlink channels transmitting data are different.

Furthermore, the data rate transmitted through each channel is not constant, and the data rate changes with time. For example, in a wireless communication system, one E-DCH can be allocated to a UE, and subsequently, if only one data channel can be mapped to the E-DCH at a specified time, data transmission efficiency would decrease and wireless channel resources would be wasted. In detail, assume that the E-DCH has a capability to transmit 1000 bits of data at a specified time. In this example, a first E-DCH designated data channel has 500 bits of data at the specified time, and a second E-DCH designated data channel has 300 bits of data at the same specified time. If one E-DCH designated data channel, which can transmit 1000 bits of data at a given time, is used to transmit 800 bits of data instead of using two different channels to transmit the same amount of data, inefficient utilization of data channel can be minimized while reducing waste of unnecessary wireless resources.

To promote efficiency of wireless communication resources, every time data passes through each sub-layer of the MAC-d/MAC-es/MAC-e, data blocks of each higher layer can be combined to form a lower layer data block. In this case, the transmitting end has to provide the receiving end information on identifying the higher layer data block so that the receiving end can accurately identify and separate a plurality of higher layer data blocks from the lower layer data block. Such information is referred to as mapping information.

Although providing detailed description of the data block combinations in the mapping information helps the receiving end to separate the data blocks, providing too much information can actually be more harmful. That is, because the mapping information is not data but control information, and therefore, providing too much control information can clog the transmission channel and waste valuable resources. Furthermore, the mapping information should minimize using the lower channels (e.g., transport channels) so that the receiving end can more accurately separate the data blocks. In other words, the mapping information should be comprised of very small number of bits or should use least amount of lower channel resources while carrying maximum amount of data.

SUMMARY OF THE INVENTION

Accordingly, the present invention is directed to a method of processing data in a Medium Access Control (MAC) layer that substantially obviates one or more problems due to limitations and disadvantages of the related art.

An object of the present invention is to provide a method of processing data in a Medium Access Control (MAC) layer through which at least one first channel is mapped to a second channel in a transmitting end of a wireless communication system.

Another object of the present invention is to provide a method of processing data in a Medium Access Control (MAC) layer through which at least one first channel is mapped to a second channel in a receiving side of a wireless communication system.

A further object of the present invention is to provide a method of processing data in a Medium Access Control (MAC) layer of a user equipment (UE) through which at least one first channel is mapped to a second channel in a transmitting end of a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing data in a Medium Access Control (MAC) layer through which at least one first channel is mapped to a second channel in a transmitting end of a wireless communication system. More specifically, the method includes configuring a MAC layer data block by including at least one higher layer data block received through the at least one first channel and adding a header thereto which includes at least one field. Here, any one of the at least one field indicates at least two types of information. Moreover, the method includes transferring the MAC layer data block to a lower layer through the second channel.

In another aspect of the present invention, a method in the receiving side in a wireless communication system includes receiving a MAC layer data block from a lower layer through the second channel, wherein the MAC layer data block includes a header which includes at least one field. Here, any one of the at least one field indicates at least two types of information. Moreover, the method includes transferring at least one higher layer data block included in the MAC layer data block to a higher layer via the at least one first channel using the at least two types of information included in the any one of at least one field.

Yet in another aspect of the present invention, a method of processing data in a Medium Access Control (MAC) layer of a user equipment (UE) includes configuring a MAC layer data block by including at least one higher layer data block received through the at least one first channel and attaching a header thereto which includes at least one field. Here, any one of the at least one field indicates at least two types of information. Furthermore, the method includes transferring the MAC layer data block to a lower layer through the second channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
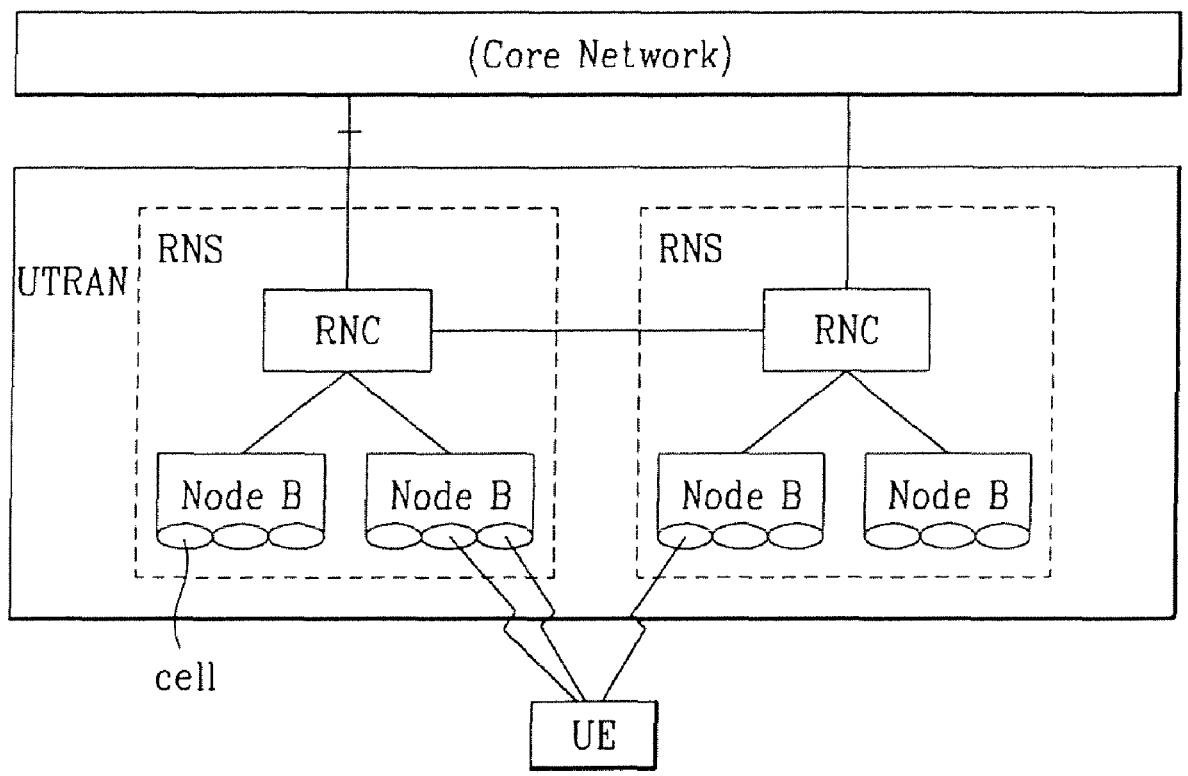
FIG. 1 is a structural diagram illustrating an Universal Mobile Telecommunication System (UMTS) network of a conventional mobile communication system.
Figure 2:
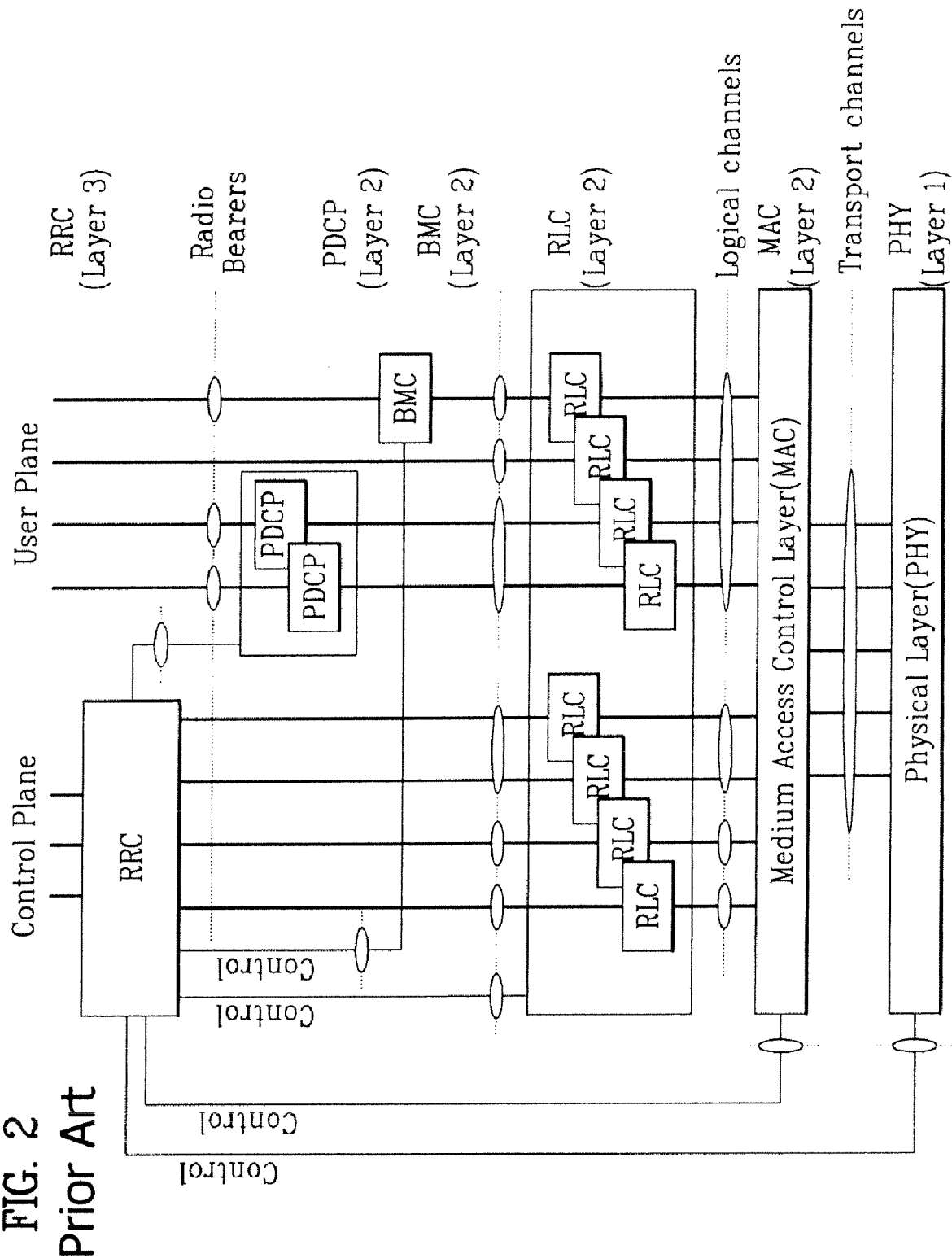
FIG. 2 is a diagram illustrating a structure of a Radio Interface Protocol (RIP) which is located between a UE and the UTRAN.
Figure 3:
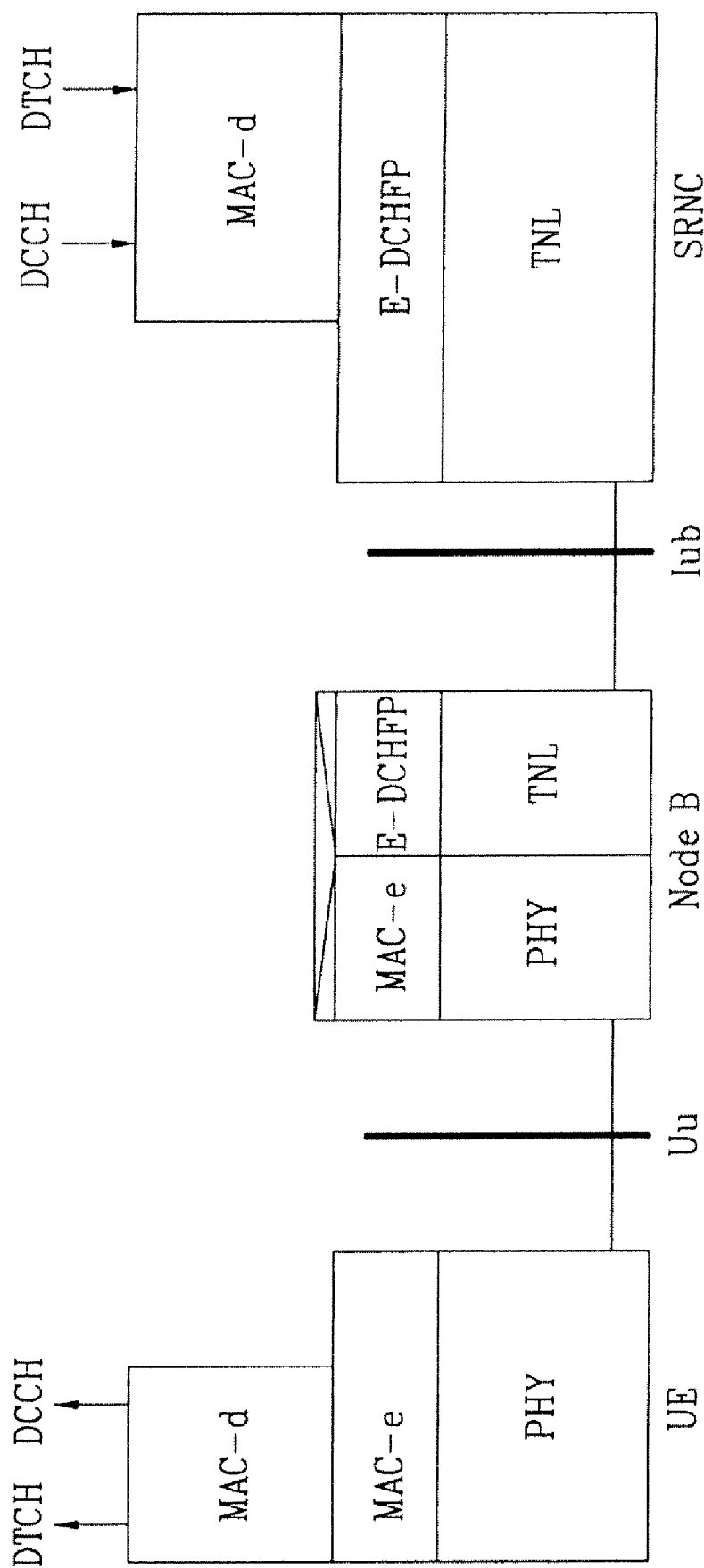
FIG. 3 is a diagram illustrating protocol of an Enhanced Dedicated Channel (E-DCH)
Figure 4:
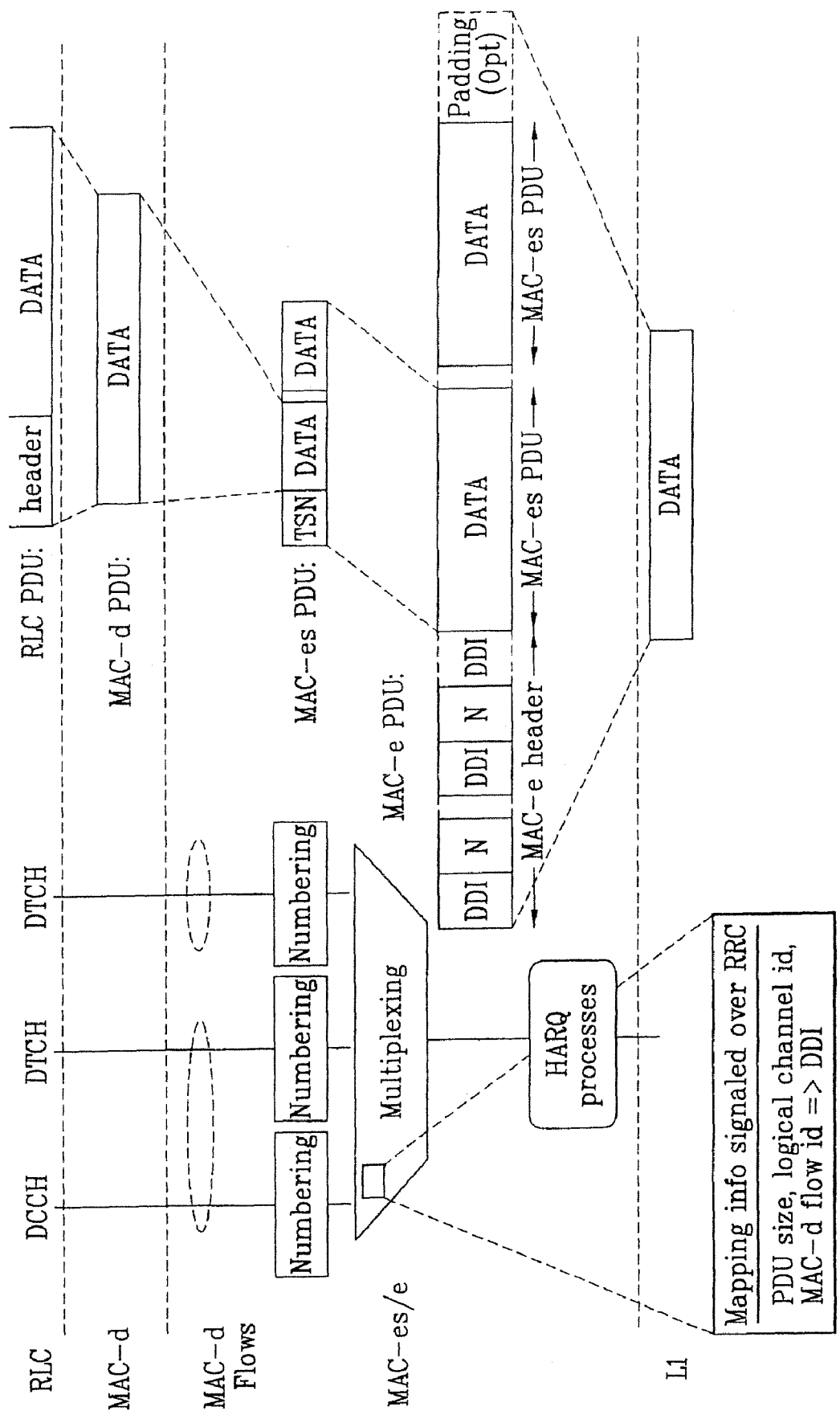
FIG. 4 is a diagram illustrating protocol for the Enhanced Dedicated Channel (E-DCH)

FIG. 4 is a diagram illustrating protocol for the Enhanced Dedicated Channel (E-DCH). In FIG. 4, both a Dedicated Channel (DCH) and the E-DCH is a transmission channel used exclusively by a UE. In particular, the E-DCH is used by the UE to transmit data in an uplink direction to the UTRAN and can transmit the data at high speed unlike the DCH. In order to transmit data at high speed, the E-DCH uses schemes such as Hybrid Automatic Repeat Request (HARQ) and Adaptive Modulation and Coding (AMC) and Node B controlled scheduling.

In order to provide support to the E-DCH, Node B transmits to the UE downlink control information for controlling E-DCH transmission by the UE. The downlink control information includes, for example, a response message (e.g., Acknowledgment/Negative Acknowledgment) for managing HARQ and E-DCH resources allocation information for Node B controlled scheduling. On the contrary, the UE transmits uplink control information to Node B. As uplink control information, there are E-DCH rate request information for Node B controlled scheduling, UE buffer status information, and UE power status information, to name a few.

For the E-DCH, a MAC-d flow is defined between the MAC-d and the MAC-e. Here, the logical channels are mapped to the MAC-d flow, which is mapped to the E-DCH, which is mapped to the Enhanced Dedicated Physical Data Channel (E-DPDCH).

The MAC-d sub-layer is responsible for managing the DCH, and the MAC-e/MAC-es sub-layers is responsible for managing the E-DCH, which is used for transmitting high speed data in the uplink direction. Currently, the MAC-e sub-layer and the MAC-es sub-layer are not clearly defined in the UE.

The MAC-d sub-layer of the transmitting end configures a MAC-d Protocol Data Unit (PDU) from a MAC-d Service Data Unit (SDU) received from the higher layer (or the RLC, to be specific). Alternatively, the MAC-d sub-layer of the receiving end identifies or separates the MAC-d SDU from the MAC-d PDU received from the lower layer and thereafter, transmits to the higher layer. Here, the MAC-d exchanges the MAC-d PDU with the MAC-e sub-layer via the MAC-d flow or exchanges the MAC-d PDU with the physical layer via the DCH. The MAC-d sub-layer of the receiving end uses the MAC-d header, which is attached to the MAC-d PDU, to restore the MAC-d SDU and transmits the restored MAC-d SDU to the higher layer.

The MAC-e/MAC-es sub-layers of the transmitting end configures a MAC-es PDU from the MAC-d PDU received from the higher layer or specifically, from the MAC-d sub-layer. The MAC-es PDU can be configured from the MAC-d PDU received via a logical channel. Moreover, since the MAC-e PDU can be configured from a plurality of the MAC-es PDUs, the MAC-e PDU can be configured from at least two MAC-d PDUs transmitted via at least two logical channels. Furthermore, in the process of creating a lower layer PDU from an higher layer PDU in the MAC layer transmitting end, a header is attached. Here, the attached header can include various control information such as mapping information. In the receiving end, the MAC-es PDU can be identified or separated from the MAC-e PDU received from the physical layer, and the MAC-es sub-layer of the receiving end restores the MAC-d PDU from the MAC-es PDU and transmits the restored MAC-d PDU to the MAC-d. Here, the MAC-e exchanges the MAC-e PDU with the physical layer via the E-DCH.

As discussed above, in order for the receiving end to receive a data block (e.g., MAC-e PDU) and to accurately separate or identify the received data block into a plurality of higher layer data blocks (e.g., MAC-es PDU or MAC-d PDU), the transmitting end has to provide the receiving end with mapping information. Preferably, in providing the mapping information to the receiving end, a data block header should be included.

Figure 5:
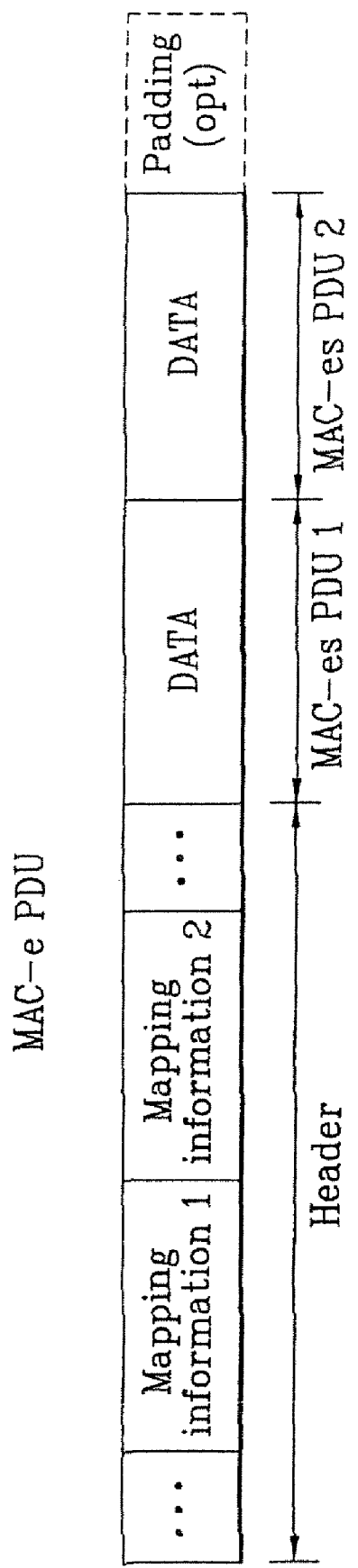
FIG. 5 is a diagram illustrating an example of a data format of a MAC-e PDU.

FIG. 5 is a diagram illustrating an example of a data format of a MAC-e PDU. In FIG. 5, the MAC-e PDU is comprised of a header portion and a data portion. The data portion can include at least one MAC-es PDU or at least one MAC-d PDU, and in this illustration, two MAC-es PDUs are included in the data portion. In the MAC-e header portion, the mapping information is included. The mapping information 1 and the mapping information 2 in FIG. 5 represent the mapping information related to the MAC-es PDU 1 and the MAC-es PDU 2, respectively.

Furthermore, the header portion includes various fields. That is, the fields can be described as various information, such as size of the data block, a number of a higher layer data blocks in the lower layer data block, and a logical channel identification, to facilitate and make possible identifying the upper layer data blocks from the lower layer data block. Without these fields or information, data block identification would be difficult. More specifically, in reference to FIG. 5, the MAC-e header portion can include various fields. In particular, one of the fields can include information for describing or identifying data of the data portion. This field can identify, for example, a logical channel, MAC-d flow, and size of the MAC-d PDUs concatenated into the associated MAC-es PDU. In addition, the other fields can identify other information such as the size of a set of consecutive MAC-d PDUs, a number of MAC-d PDUs, and identification of a logical channel.

Preferably, the mapping information uses a minimum amount of lower channel (i.e., transport channel) resources and provides accurate information so that the receiving end can accurately separate or identify the higher layer data blocks from the lower layer data block. In other words, the mapping information should be made up of a small number of bits or should use a least amount of lower channel resources while including a maximum amount of data.

In the mapping information, certain information can be considered necessary in making effective mapping information. The mapping information should include information for identifying channels, information for identifying the size of the data block, and information on the number of data blocks. The details of each type of information will be described in detail.

As an embodiment of the present invention, the objective is to minimize the size of the mapping information. To accomplish this, as discussed above, the mapping information has to include information for identifying channels. That is, if at least one higher layer data block transmitted via at least one higher channel (e.g., logical channel) is used to form or configure a single lower layer data block, the mapping information should provide information necessary to identify via which logical channel(s) at least one data block came from. Additionally, the mapping information should include information for identifying the size of the higher layer data block (or amount of data in each data block) or alternatively, the boundary line for each higher layer data block in the lower layer block. As such, using the mapping information, the receiving end should be able to identify from the single lower layer data block which higher layer data was transmitted via which logical channel.

Absent the mapping information, it is still possible to determine how the lower layer data block was formed or configured at the receiving end. However, since the receiving end does not have information on channel identification and/or the size of the data blocks, the receiving end most likely cannot accurately reconstruct and transmit the data to each respective channel.

In addition to the information for identifying channels and the information for identifying the size of the data block, the mapping information can be included is the number of the higher layer data blocks. The discussion of the number of data blocks will be provided below.

As for minimizing the size of the mapping information, information related to identifying channels can be reduced. More specifically, a higher layer data block (e.g., MAC-e PDU) includes a header as it is transmitted via a logical channel. A header comprises at least one field in which various information related to the data block is included. For example, a field can include information identifying a logical channel, MAC-d flow, and size of the MAC-d PDUs concatenated into the associated MAC-es PDU (hereinafter, this field is referred to as "data description field"). Moreover, the header can include fields containing information of the MAC-e PDU pertaining to, for example, a size index, which is a field that identifies the size of a set of consecutive MAC-d PDUs, a logical channel identification (ID), which is a field that provides identification of the logical channel instance when multiple logical channels are carried on the same MAC-d flow, and a number of MAC-d PDUs, which identifies the number of consecutive MAC-d PDUs corresponding to the value of the data description field.

The mapping between the data description field value and the logical channel ID, MAC-d flow, and the PDU size is provided by higher layers. Furthermore, due to the quantization in the lower block sizes (e.g., transport block sizes) that can be supported, the data description field value of can be appended at the end of the MAC-e header to indicate that there are no more MAC-es PDUs concatenated into this particular MAC-e PDU.

Naturally, each field in the header is represented with at least 1 bit. As such, having a plurality of these information fields can result in the header having a relatively large number of bits. A size information field is comprised of the size index (3 bits), the number of MAC-d PDUs (7 bits), and a flag (1 bit), totaling 11 bits. At the same time, the logical channel ID, which is comprised of 4 bits, can take varying size depending on the number of logical channels and the number of MAC-d PDUs. Evidently, the size of the size information field and the logical channel ID field in the header is noticeably significant.

The functionality of the logical channel ID field is needed because it identifies the logical channel to which the MAC-d PDU is related. However, it is not necessary to include the logical channel ID field in each MAC-d PDU, which means that the increase in the size of the header corresponds directly to the number of MAC-d PDUs. From the fact that one MAC-e PDU includes more than one MAC-d PDU from the same logical channel, the logical channel ID can be included only once for each series of MAC SDU from one logical channel. In other words, only one common logical identification ID should be attached for all the MAC-d SDUs that belong to the same logical channel. In practice, having one common logical channel ID field does not cause ambiguity problem in the receiver side since the MAC-d SDUs have the same logical channel ID field value.

Alternatively, the size index field can be excluded from the header to reduce the size of the MAC-e PDU by referring to the logical channel ID field. In other words, this can be done by inferring the PDU size from the logical channel directed by the logical channel ID filed.

In short, the size of the mapping information can be reduced by including the logical channel ID field once for the series of MAC-d PDUs for the same logical channel in the MAC-e PDU header, and by not including the size index field in the MAC-e PDU header.

In addition to reducing the size of the mapping information by reducing or eliminating unnecessary field information from the header of the data block, the data block can be more efficiently utilized. As described above, one of the information the mapping information should include is identifying the size of the data block or amount of data for each data block. As one of the methods of reducing the mapping information size, the information related to amount of data transmitted via a logical channel, included in the mapping information, can be provided directly. That is, if a 100 bit data is transmitted via a first logical channel to a lower layer data block, this information is directly provided to the receiving end. In this situation, a size of the mapping information, which provides the data amount, increases in accordance with a maximum amount of data that can be included in the single lower layer data block. For example, if the amount of data that lower layer data block can transmit is maximum of 1000 bits, the mapping information for providing channel information should be at least $\log_2 10000=14$ bits.

Alternatively, as another method of reducing the size of the mapping information, a set of smaller size data blocks or amount sizes can be assigned with respect to a higher layer data block. In other words, the size of the smaller size data blocks (or amount of smaller amount size) is smaller than the size (or amount) of one higher layer data block. Thereafter, the higher layer data block size or amount is defined based on the number of smaller-sized data blocks. For example, if the amount of data in the higher layer data block is 100 bits, this 100 bit data block can be expressed with 10 data blocks where each block size is 10 bits or 5 data blocks where each block size is 20 bits. Here, if the transmitting side and the receiving side both agree to express or index and map the 10 bit data block or the 20 bit data block into smaller data size (e.g., 10 bits='1' or 20 bits='2'), the size of the higher layer data block can be reduced since the size of data is expressed using the index.

In operation, it is possible to consider the different nature or characteristics of each channel. For example, if the first logical channel transmits smaller data size, then the first logical channel can use indexing of 10 bits='1' and 20 bits='2' for mapping the data blocks. At the same time, if the second logical channel transmits larger data size, the second logical channel can use indexing of 50 bits='1' and 100 bits='2' for mapping the data blocks. As such, different logical channels can be specialized.

The following is Table 1 illustrates an example of indexes in mapping information relative to the sizes of data blocks from each channel.

TABLE 1

|  | 1st Logical Channel | 2nd Logical Channel | 3rd Logical Channel |
| --- | --- | --- | --- |
| Index 1 | 100 bits | 50 bits | 50 bits |
| Index 2 | 200 bits | 60 bits | 75 bits |
| Index 3 | 300 bits | 70 bits | 100 bits |

In the previous example, the data bit sizes of the data in a specific channel can be fixed without variance. That is, if the sizes of the data block in the specified channel is fixed or constant, the transmitting and receiving sides do not have to confirm the data bit sizes every time data block is transmitted and received. Instead, as long as the receiving end knows from which logical channel the data block is transmitted, the receiving end can determine the sizes of the data block. Therefore, it is possible to combine or separate a data block without transmitting and receiving the mapping information.

In combining at least one higher layer data block into a single lower layer data block or vice versa, it is meaningless to have information of the size of at least one higher layer data blocks. That is, in order for the receiving end to accurately determine from a single lower layer data block the data sizes transmitted via each channel, not only does the receiving end need information on size of at least one higher layer data, it also needs information of a number of higher layer data blocks.

Furthermore, in another method, if the single lower layer data block is formed from at least one higher layer data block, the data size of the higher layer data block transmitted via one logical channel can be defined by at least index. For example, referring to Table 1, in configuring one lower layer data block, assume that there is 500 bits of data in the first logical channel. Here, five 100 bit-sized data blocks of index 1 can be used to define 500 bits. In other words, the same index of the same channel can be used to define or express the size of the higher layer data block. Alternatively, one 200 bit-sized data block of index 2 can be used along with one 300 bit-sized data block of index 3 to define 500 bits.

An advantage of using one index in forming or configuring one lower layer data block is that by using one and same index to define or express each higher layer data block size, the mapping information can be smaller in size than if more than one index is used. On the flip side, a disadvantage of using one index over a plurality of indexes is that depending on the size of the higher layer data block, the fixed size of one index sometimes cannot exactly define or express the higher layer data block size. If the second logical channel has 130 bits, for example, again referring to Table 1, using only index 1 would not be able to accurately define or express 130 bits since the data block size of index 1 of the second logical channel is 50 (50 bits×3=150), hence 20 bits would be wasted. However, if the same number of bits can be defined or expressed using index 2 and index 3 (60 bits+70 bits=130 bits), data size of the higher layer data block can be accurately expressed.

As mentioned above, another information that has to be included in the mapping information of the lower layer data block is a number of data blocks, which is mapped to each index for defining or expressing the data size of the lower layer data blocks. Referring to the previous example, the higher layer data block of 500 bits is transmitted the first logical channel. In this case, the receiving end cannot accurately identify the higher layer data blocks from the lower layer data block if the mapping information contains information such as that the higher layer data block was transmitted via the first logical channel, and that the data sizes the higher layer data block was defined or expressed based on index 1. To put differently, information on the number of 50 bit data blocks used must be provided as well. Here, the value indicated by the index can be data block size information or a different parameter related to the characteristic of a channel.

Another method of minimizing the size of the mapping information, a channel identification (ID) of a channel used to transmit higher layer data blocks and size of upper layer data blocks can be predefined between the transmitting side and the receiving side using an index. The difference in this method from the previously explained method is that the channel ID of the higher layer data block transmitting channel can be defined using the index. Here, the index can be considered as a field in the header.

More specifically, the index can be used to define the originating channel through which the data of the higher layer data block, which is a part of one lower layer data block, was transmitted, and to arrange in advance the transmitting end and the receiving end to provide the size of the higher layer data block. This index, containing the above information, is then included in the mapping information. For example, assume that the first logical channel and the second logical channel are mapped together to a single channel using the MAC layer, and that the first logical channel has a set having three sizes that can be configured and the second logical channel has a set having five sizes that can configured. Here, if the channel ID and the data size information are coded to the mapping information, respectively, 1 bit channel ID information and 3 bit data size information, totaling 4 bits, are necessary. However, if the channel ID and the data size information are expressed or defined by one index and then coded, the index can have a size of 3 bits since a possible total combination is 8. Consequently, the size of the mapping information can be minimized.

The embodiments of the present invention are described with respect to the wireless communication system. However, the embodiments of the present invention can apply to other devices such as a Personal Digital Assistant (PDA) and a notebook/mobile computer having wireless communication capabilities. In addition, the terminologies used to describe the embodiments of the present invention are not limited to the UMTS or similar wireless communication system. Furthermore, the embodiments of the present invention can apply to various wireless interface techniques such as a Time Division Multiple Access (TDMA), Code Division Multiple Access (CDMA), and Frequency Division Multiple Access (FDMA), and can also apply to wireless communication systems using a physical layer.

The embodiments of the present invention can be expressed in software, firmware, hardware, or in any combination thereof. In other words, the embodiments of the present invention can be embodied in a hardware using hardware logics such as codes, a circuit chip, an Application Specific Integrated Circuit (ASIC). Moreover, a computer language can be used to express as codes the embodiments of the present invention into a recording device, such as hard disk drive (HDD), floppy disk, and a tape, and an optical storage medium, a Read Only Memory (ROM), and a Random Access Memory (RAM).

Figure 6:
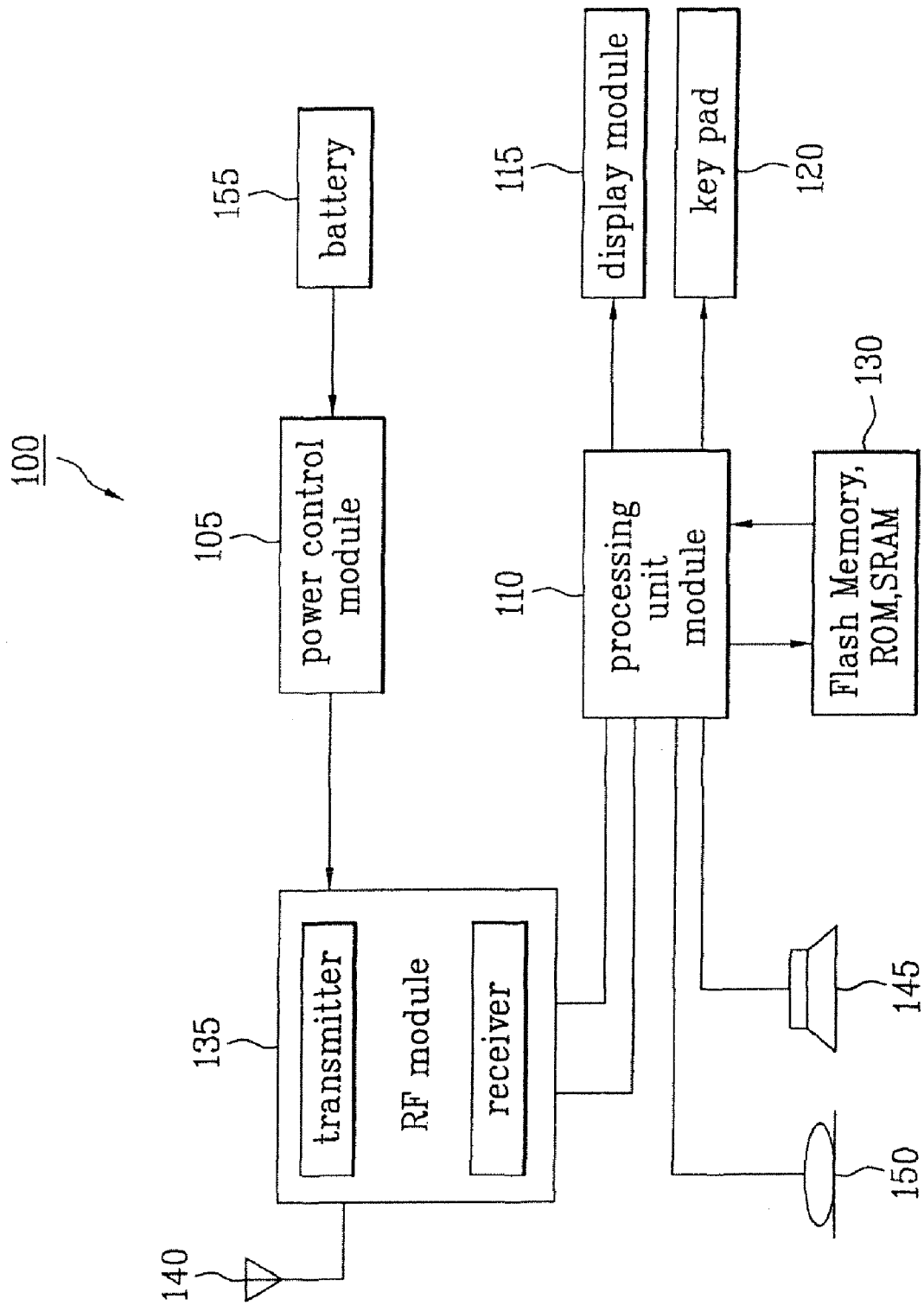
FIG. 6 is a structural diagram of a wireless communication device for carrying out the embodiments of the present invention.

FIG. 6 is a structural diagram of a wireless communication device for carrying out the embodiments of the present invention. In FIG. 6, a wireless communication device 100 includes a processing unit module 110 (e.g., micro processor or digital processor), a Radio Frequency (RF) module 135, a power control module 106, an antenna 140, a battery 155, a display module 115, a keypad 120, a storage module 130, a speaker 145, and a microphone 150.

A user enters command information via the keypad 120 or the microphone 145. The processing unit 110 processes the inputted command information in order to execute the user requested command. At the same time, the storage module 130 is searched for necessary data in executing the command, and the processing unit module 110 instructs the display module 115 to display to the user the inputted command information and the acquired data from the storage module 130.

Thereafter, the processing unit module 110 transmits the command information to the RF module 135 so that wireless signal, including the voice communication data, can be transmitted by the RD module 135. The RF module 135 possesses a transmitter and a receiver for transmitting and receiving signals, and the wireless signals are ultimately transmitted and received to and from the antenna 140. If the RF module 135 receives the wireless signal, the processing unit module 110 converts the received wireless signal to base band frequency so that the wireless signal can be processed. The converted signal is transmitted the speaker 145 or transmitted as decoded information.

The RF module 135 is used to receive data from the network or transmit information detected or generated from the wireless communication device. The storage module 130 stores information detected or generated from the wireless communication device. Moreover, the processing unit module 110 receives data from the wireless communication device, processes the received data, and/or transmits the processed data.

The wireless communication device according to the embodiments of the present invention, as illustrated in FIG. 4, can include a protocol stack which is comprised of a plurality of layers. The MAC layer of the UE can combine an higher layer data block with the MAC layer data block via at least one logical channel. Furthermore, the MAC layer of the UE can also combine channel ID information of the higher layer delivered to the MAC layer via the higher layer data block and combine a mapping information including information related to amount of data of each higher layer data block to the MAC layer data block. In addition, the MAC layer of the UE can transmit the MAC layer data block to a lower layer via the lower channel (i.e., transport channel). The steps of above can be expressed or coded in a software or a hardware.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing data in a Medium Access Control (MAC) layer in a transmitting side of a wireless communication system, the method comprising:
   receiving at least one higher layer protocol data unit (PDU) through at least one of a plurality of logical channels;
   configuring at least one MAC-es PDU by including the at least one higher layer PDU; and
   configuring a MAC-e PDU by including a header and the at least one MAC-es PDU, wherein the header comprises a plurality of fields, a single field of the plurality of fields indicating at least two types of information used for identifying the at least one higher layer PDU, wherein the at least two types of information includes logical channel information and a size of the at least one higher layer PDU, wherein the plurality of logical channels are mapped to an uplink transport channel.

2. The method of claim 1, wherein the at least one higher layer PDU is a MAC-d service data unit (SDU), and wherein receiving at least one higher layer PDU comprises:
configuring at least one MAC-d PDU from the at least one MAC-d SDU; and
transferring the at least one MAC-d PDU to a MAC-es sublayer.

3. The method of claim 2, wherein the single field of the plurality of fields identifies a logical channel, a MAC-d flow, and a size of the at least one MAC-d PDU concatenated into the corresponding MAC-es PDU.

4. The method of claim 1, wherein each of the plurality of logical channels comprises a dedicated control channel (DCCH) and a dedicated traffic channel (DTCH).

5. The method of claim 1, wherein the single field of the plurality of fields corresponds to each of the at least one MAC-es PDU in the MAC-e PDU.

6. The method of claim 1, wherein the single field of the plurality of fields further identifies a MAC-d flow.

7. The method of claim 6, wherein mapping between the single field of the plurality of fields and all of the logical channel, the MAC-d flow and the size of the at least one higher layer PDU is provided by higher layers.

8. The method of claim 1, wherein the uplink transport channel is an Enhanced Dedicated Channel (E-DCH).

9. The method of claim 8, wherein the E-DCH is mapped to an Enhanced Dedicated Physical Data Channel (E-DPDCH).

10. The method of claim 8, wherein the E-DCH supports at least a hybrid automatic repeat request (HARQ), an adaptive modulation and coding (AMC), or a NodeB controlled scheduling.

11. The method of claim 1, further comprising transferring the MAC-e PDU to a lower layer through the uplink transport channel.

12. The method of claim 1, wherein the header further includes another field indicating a number of the at least one higher layer PDU being indicated by each of the at least one field.

13. A method of processing data in a Medium Access Control (MAC) layer in a receiving side of a wireless communication system, the method comprising:
demultiplexing at least one MAC-es protocol data unit (PDU) from a MAC-e PDU based on information in a header of the MAC-e PDU, wherein the header comprises a plurality of fields, a single field of the plurality of fields indicating at least two types of information used for identifying at least one higher layer PDU, wherein the at least two types of information includes logical channel information and a size of the at least one higher layer PDU;
demultiplexing the at least one higher layer PDU from each of the at least one MAC-es PDU; and
transferring the at least one higher layer PDU to a higher layer through at least one of a plurality of logical channels,
wherein the plurality of logical channels are mapped to an uplink transport channel.

14. The method of claim 13, wherein the at least one higher layer PDU is a MAC-d service data unit (SDU), and wherein transferring the at least one higher layer PDU comprises:
receiving at least one MAC-d PDU from a MAC-es sublayer; and
acquiring at least one MAC-d SDU from the at least one MAC-d PDU.

15. The method of claim 14, wherein the single field of the plurality of fields identifies a logical channel, a MAC-d flow, and a size of the at least one MAC-d PDU concatenated into the corresponding MAC-es PDU.

16. The method of claim 13, wherein each of the plurality of logical channels comprises a dedicated control channel (DCCH) and a dedicated traffic channel (DTCH).

17. The method of claim 13, wherein the single field of the plurality of fields corresponds to each of the at least one MAC-es PDU in the MAC-e PDU.

18. The method of claim 13, wherein the single field of the plurality of fields further identifies a MAC-d flow.

19. The method of claim 18, wherein mapping between the single field of the plurality of fields and all of the logical channel, the MAC-d flow, and the size of the higher layer PDU is provided by higher layers.

20. The method of claim 13, wherein the uplink transport channel is an Enhanced Dedicated Channel (E-DCH).

21. The method of claim 20, wherein the E-DCH is mapped to an Enhanced Dedicated Physical Data Channel (E-DPDCH).

22. The method of claim 20, wherein the E-DCH supports at least a hybrid automatic repeat request (HARQ), an adaptive modulation and coding (AMC), or a NodeB controlled scheduling.

23. The method of claim 13, further comprising receiving the MAC-e PDU from a lower layer through the uplink transport channel.

24. The method of claim 13, wherein the header further comprises another field indicating a number of the at least one higher layer PDU being indicated by each of the at least one field.

* * * * *